Figure 1:
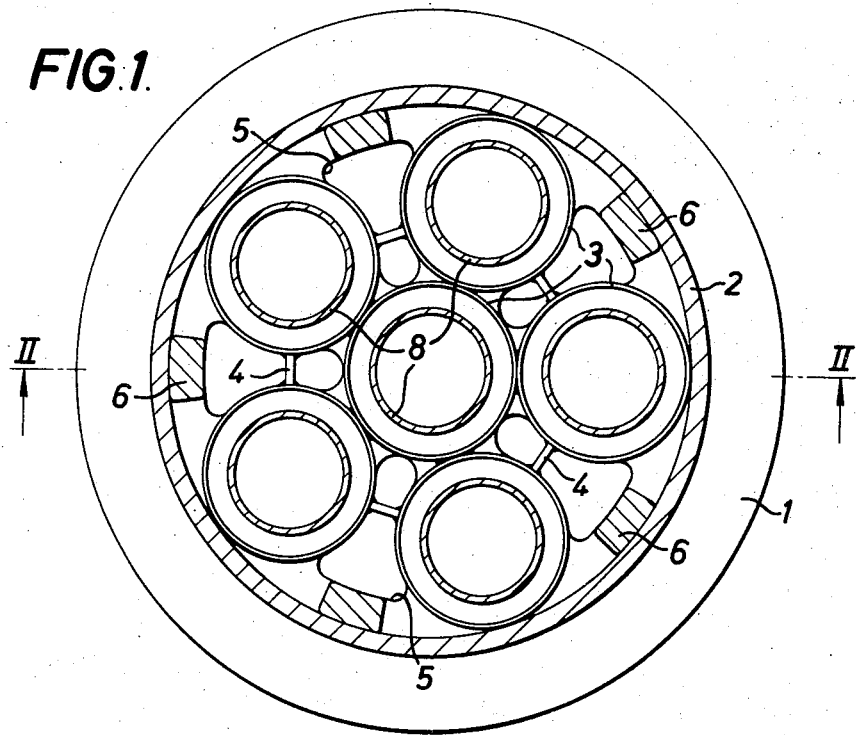

United States Patent [19]

Somogyi

[11] 3,833,153

[45] Sept. 3, 1974

[54] FLUID FLOW DISCHARGING APPARATUS

[76] Inventor: Francis Paul Somogyi, 17 Waterloo Pl., London, England

[22] Filed: Jan. 24, 1973

[21] Appl. No.: 326,271

[52] U.S. Cl. ............................................. 222/193
[51] Int. Cl. ............................................. B67d 5/54
[58] Field of Search ........ 222/193, 194, 195, 424.5; 137/268

[56] References Cited
UNITED STATES PATENTS

| 780,330 | 1/1905 | Egert | 222/193 |
|---|---|---|---|
| 1,360,642 | 11/1920 | Irwin | 222/193 |
| 2,366,763 | 1/1945 | Wieland | 222/193 |
| 2,652,810 | 9/1953 | Paul | 222/193 |
| 2,817,310 | 12/1957 | Ponzini | 222/193 |
| 3,237,805 | 3/1966 | Stogner | 222/193 X |

Primary Examiner—Robert B. Reeves
Assistant Examiner—H. Grant Skaggs, Jr.
Attorney, Agent, or Firm—Walter G. Finch

[57] ABSTRACT

In order to discharge granular material from a container a discharge pipe including a trap is provided in the lower part of the container. Granular material flows upwardly in the trap to an equilibrium level. Injected fluid flushes granular material from the trap out of the container. More granular material flows into the trap to replace that which has been flushed out.

4 Claims, 2 Drawing Figures

PATENTED SEP 3 1974  3,833,153

FLUID FLOW DISCHARGING APPARATUS

This invention relates to flow control of flowable particulate material and in particular is concerned with the discharge of particulate material from containers such as hoppers, filtration columns and/or ion exchangers.

It is an object of the present invention to provide an improved discharge arrangement which does not involve fluidising the bulk of the particulate material in the container.

If particulate material leaving the lower part of a container is directed by a trap in an upward direction the particulate material attains an equilibrium level and stops. This level will normally be higher if the material is submerged in a liquid, than if the material is dry. The level is also a function of particle size and the density of the solid and of the liquid. The trap is so dimensioned that no material is discharged i.e. the structure in which the material moves upwardly is higher than the equilibrium level.

The present invention proposes ejecting the particulate material entrained in the trap with injected fluid (gas, air or liquid) thus causing or allowing the fluid carrying the particulate material to move upwardly out of the trap. Particulate material removed from the trap will be replaced by material within the container to discharge the container. Discharging continues until the flow of fluid ceases.

The words "entrained" and "ejected" apply both to the situation when the particulate material is fluidised and displaced and to the situation when the particulate material is removed as a slurry.

In an embodiment a pipe depends from the base of a container into a trap concentric with the pipe. A liquid injection nozzle is positioned in the trap under the end of the pipe. Particulate material from the container flows down the pipe into the trap and upwardly into the annular space between the outer wall of the pipe and the inner wall of the trap to an equilibrium level. To cause particulate material to flow out of the container, liquid is injected into the trap conveniently radially outwardly from the nozzle or directly upward into the annular gap to entrain particulate material and to convey it upwardly out of the annular space to an exit. Discharging of the container continues until the liquid injection ceases or the container is emptied. In another embodiment the trap is constituted by a bend, for example U-shaped, in the discharge pipe.

The invention finds particular but not exclusive application to the filtration process and apparatus which form the subject of our Appln. No. 110,008.

Figure 2:
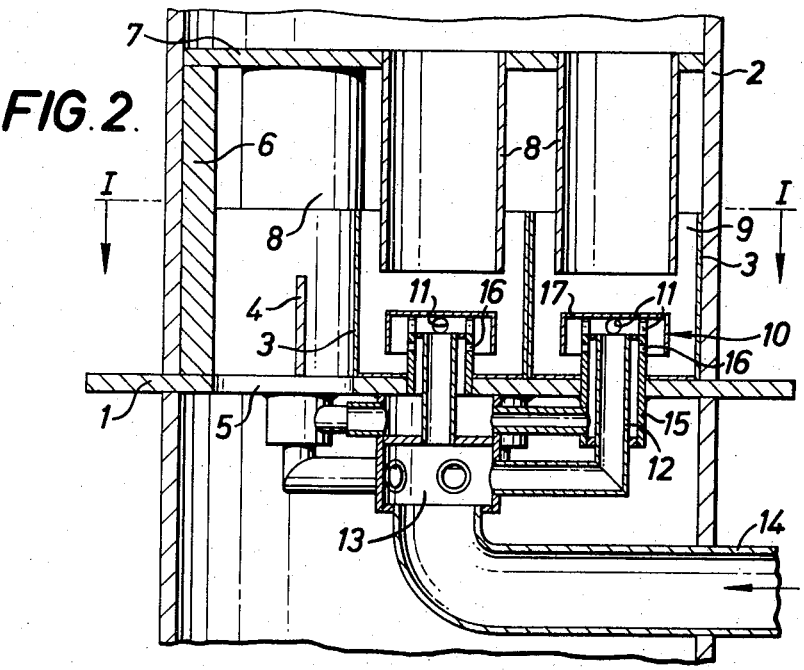

A particular embodiment of the present invention thus applied will now be described by way of example and with reference to the accompanying drawings wherein:

FIG. 1 is a plan sectional view on the line I — I of FIG. 2 of the lower part of a filtration apparatus and FIG. 2 is a section on the line II — II of FIG. 1.

The apparatus illustrated comprises a circular base plate 1 supporting an upstanding cylindrical filtration column 2. The base plate 1 supports six cylindrical open-topped traps 3, a central trap and five surrounding traps. The peripheries of the surrounding traps are welded to the periphery of the central trap. Spacer strips 4 connect the peripheries of the surrounding traps. An aperture 5 for the escape of particulate material is formed between each adjacent pair of traps.

Five upstanding pillars 6 angularly spaced around the inner periphery of the column wall support a circular floor 7 on which the particulate material in the column rests. A cylindrical discharge pipe 8 extends through the floor 7 into each of the traps 3. An annular space 9 is defined between the lower end part of each pipe 8 and the upper end part of each trap 3.

A nozzle assembly 10 is provided in the lower part of each trap 3. Each nozzle assembly comprises a liquid spray head consisting of radially outwardly facing nozzles 11 and a pipe 12 connecting the nozzles 11 to a central chamber 13. The chamber 13 is connected by a pipe 14 to a liquid source. A jacket 15 surrounding the upper part of the pipe 12 is connected to a central source of air under pressure. The air is injected immediately under the nozzles 11 through jets 16. A protective cap 17 is positioned over each nozzle assembly.

The inlet for liquid to be filtered is provided in the lower part of the column 1 and liquid from this inlet can be directed by an appropriate valve to the nozzle inlet pipe 14.

In use, particulate material from the column flows down the discharge pipes 8 into the trap to a particular level in the annular space 9 between the pipe and the trap 13. When it is desired to remove particulate material from the column the valve is operated and liquid directed through the nozzles 11 into the annular space 9. The liquid entrains particulate material and moves it upwardly in the said annular space out of the trap 3 from where it falls out of the column through the holes 5.

I claim:

1. Apparatus for discharging particulate material from a container holding said material, comprising:
   support means in the container for maintaining the particulate material in said container against the influence of gravity,
   discharge means formed in said support means and extending spatially from said support means from the side thereof opposite that portion of the interior of the container within which said particulate matter is held,
   trap means spaced from the support means and open at the end thereof disposed nearest to said support means, the open end thereof communicating with an extended portion of said discharge means, the discharge means thereby communicating the aforesaid interior portion of said container in which the particulate matter is held with the interior of said trap means; with the extended portion of said discharge means being received within the open end of said trap means,
   means for injecting fluid into the trap means to force particulate material through the open end thereof, which particulate material has emptied into said trap means from the container through said discharge means, and base means mounting said trap means in spaced relation to said support means and discharge means, said base means having at least one aperture therein through which material forced from said trap means may pass.

2. The apparatus of claim 1 wherein said means for injecting fluid into the trap means comprises:
   a nozzle assembly mounted within said trap means and spaced from said discharge means extending into said trap means, said nozzle assembly including a plurality of radially outwardly facing nozzles, pipe means for supplying fluid to said nozzles, and a protective cap disposed over said nozzles for preventing contact between said nozzles and the particulate matter in said trap means.

3. The apparatus of claim 2 wherein said discharge means comprise a plurality of substantially cylindrical pipes and said trap means comprise a plurality of substantially cylindrical receptacles open at one end thereof, said pipes being open at both ends thereof and each extending from said support means into the open end of one each of said receptacles.

4. The apparatus of claim 3 and further comprising:

base means mounting said trap means in spaced relation to said support means and discharge means, said latter base means having a plurality of apertures therein disposed between said trap means and providing exits through which material forced from said trap means may pass.

* * * * *